United States Patent
Davis

(10) Patent No.: US 8,714,502 B1
(45) Date of Patent: May 6, 2014

(54) BRACKET ASSEMBLY

(76) Inventor: Joe N. Davis, Eutawville, SC (US)

( * ) Notice: Subject to any disclaimer, the term of this patent is extended or adjusted under 35 U.S.C. 154(b) by 262 days.

(21) Appl. No.: 12/838,018

(22) Filed: Jul. 16, 2010

(51) Int. Cl.
*F16B 1/00* (2006.01)

(52) U.S. Cl.
USPC ............... 248/228.3; 248/214; 248/228.1

(58) Field of Classification Search
USPC ............... 248/72, 214, 218.4, 228.1, 228.3, 248/228.7, 228.4
See application file for complete search history.

(56) References Cited

U.S. PATENT DOCUMENTS

| | | | |
|---|---|---|---|
| 497,679 A * | 5/1893 | Newbury | 248/72 |
| 1,797,214 A * | 3/1931 | Mayer et al. | 248/68.1 |
| 1,974,628 A * | 9/1934 | Presley | 248/228.3 |
| 1,976,595 A * | 10/1934 | Asleson et al. | 248/228.1 |
| 2,206,775 A * | 7/1940 | Hoofer | 40/324 |
| 2,345,650 A * | 4/1944 | Attwood | 403/21 |
| 2,470,992 A * | 5/1949 | Kindorf et al. | 248/72 |
| 2,634,928 A * | 4/1953 | Hawes | 248/514 |
| 2,669,763 A * | 2/1954 | Unneland | 249/211 |
| 2,928,364 A * | 3/1960 | Davis | 269/41 |
| 3,664,626 A * | 5/1972 | Sneller | 248/224.7 |
| 4,088,079 A * | 5/1978 | Herzog | 104/111 |
| 4,114,159 A * | 9/1978 | Verini | 343/715 |
| 4,397,437 A | 8/1983 | Madej | |
| 4,417,713 A * | 11/1983 | Snowden et al. | 248/231.85 |
| D308,327 S | 6/1990 | Klippel | |
| D317,558 S | 6/1991 | Daigle et al. | |
| 5,055,864 A * | 10/1991 | Slikkers | 396/428 |
| 5,615,850 A | 4/1997 | Cloninger | |
| 5,878,519 A * | 3/1999 | Huyck et al. | 40/612 |
| 6,557,807 B1 | 5/2003 | Belanger | |
| 6,604,715 B2 | 8/2003 | Howe | |
| 6,962,234 B1 * | 11/2005 | Reeves | 182/36 |
| 7,000,730 B1 * | 2/2006 | Ostrobrod | 182/36 |
| D528,900 S | 9/2006 | Thompson | |
| 7,597,291 B2 * | 10/2009 | Hoffmann | 248/72 |
| 2007/0095341 A1* | 5/2007 | Kaneff | 126/601 |
| 2008/0277549 A1* | 11/2008 | Curtin | 248/228.3 |
| 2009/0072098 A1 | 3/2009 | Smallhorn | |

* cited by examiner

*Primary Examiner* — Bradley Duckworth

(57) ABSTRACT

A bracket assembly includes an elongated plate that has a first end, a second end, a front side, a back side, an upper edge and a lower edge. A first coupler is attached to and extends away from the back side. The first coupler is positioned adjacent to the first end. A second coupler is attached to and extends away from the back side. The second coupler is positioned adjacent to the second end. A catch is attached to and extends away from the front side of the plate. The catch is positioned between the first and second ends. The first and second couplers are engageable with opposite sides of a support member to allow an article to be positioned on the catch.

6 Claims, 6 Drawing Sheets

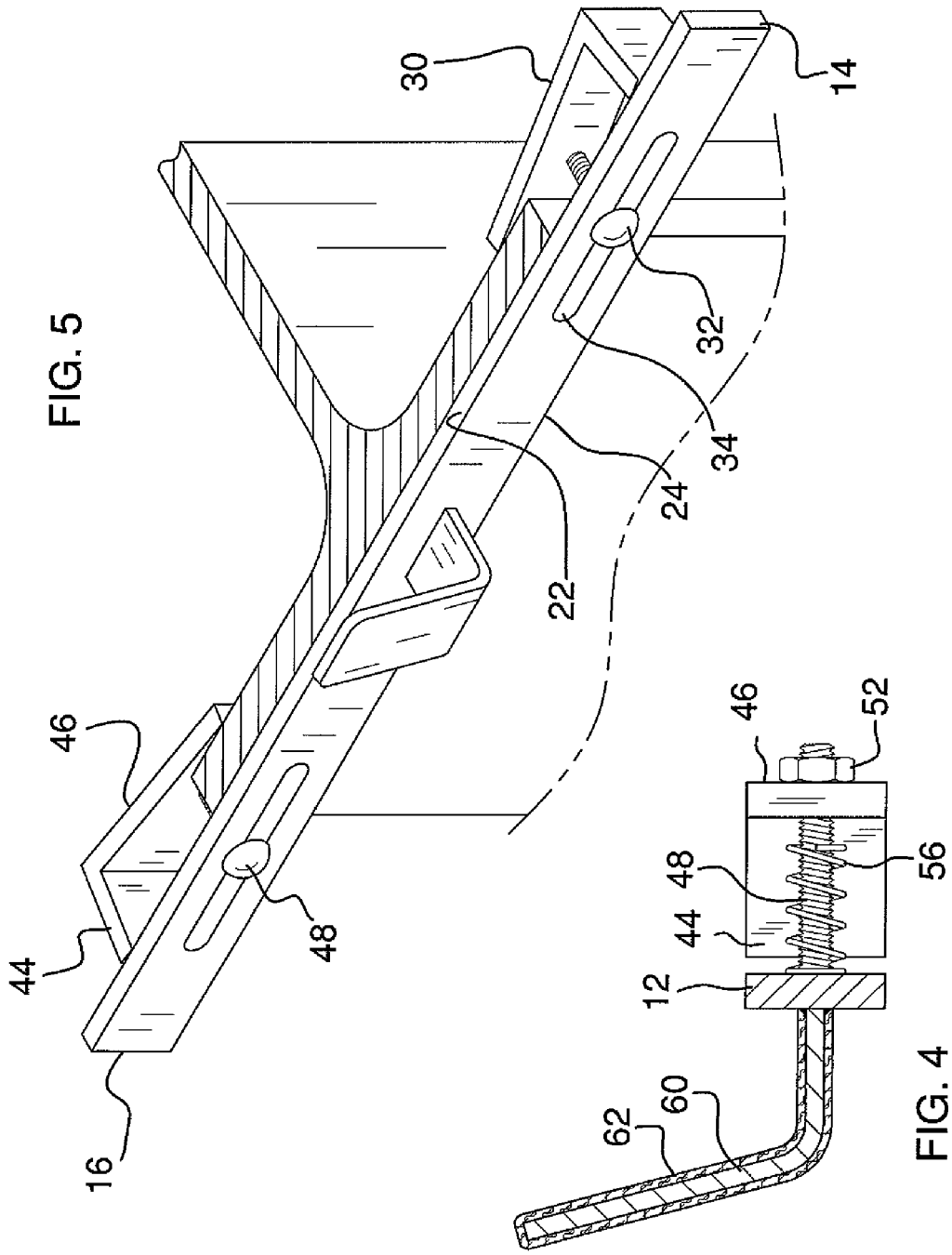

BRACKET ASSEMBLY

BACKGROUND OF THE DISCLOSURE

Field of the Disclosure

The disclosure relates to bracket devices and more particularly pertains to a new bracket device for attachment of articles to support beams and in particular to I-beams.

SUMMARY OF THE DISCLOSURE

An embodiment of the disclosure meets the needs presented above by generally comprising an elongated plate that has a first end, a second end, a front side, a back side, an upper edge and a lower edge. A first coupler is attached to and extends away from the back side. The first coupler is positioned adjacent to the first end. A second coupler is attached to and extends away from the back side. The second coupler is positioned adjacent to the second end. A catch is attached to and extends away from the front side of the plate. The catch is positioned between the first and second ends. The first and second couplers are engageable with opposite sides of a support member to allow an article to be positioned on the catch.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein:

FIG. 4 is a cross sectional view of an embodiment of the disclosure taken along line 4-4 of FIG. 3.

FIG. 5 is a perspective in-use view of an embodiment of the disclosure.

DESCRIPTION OF THE PREFERRED EMBODIMENT

Figure 1:
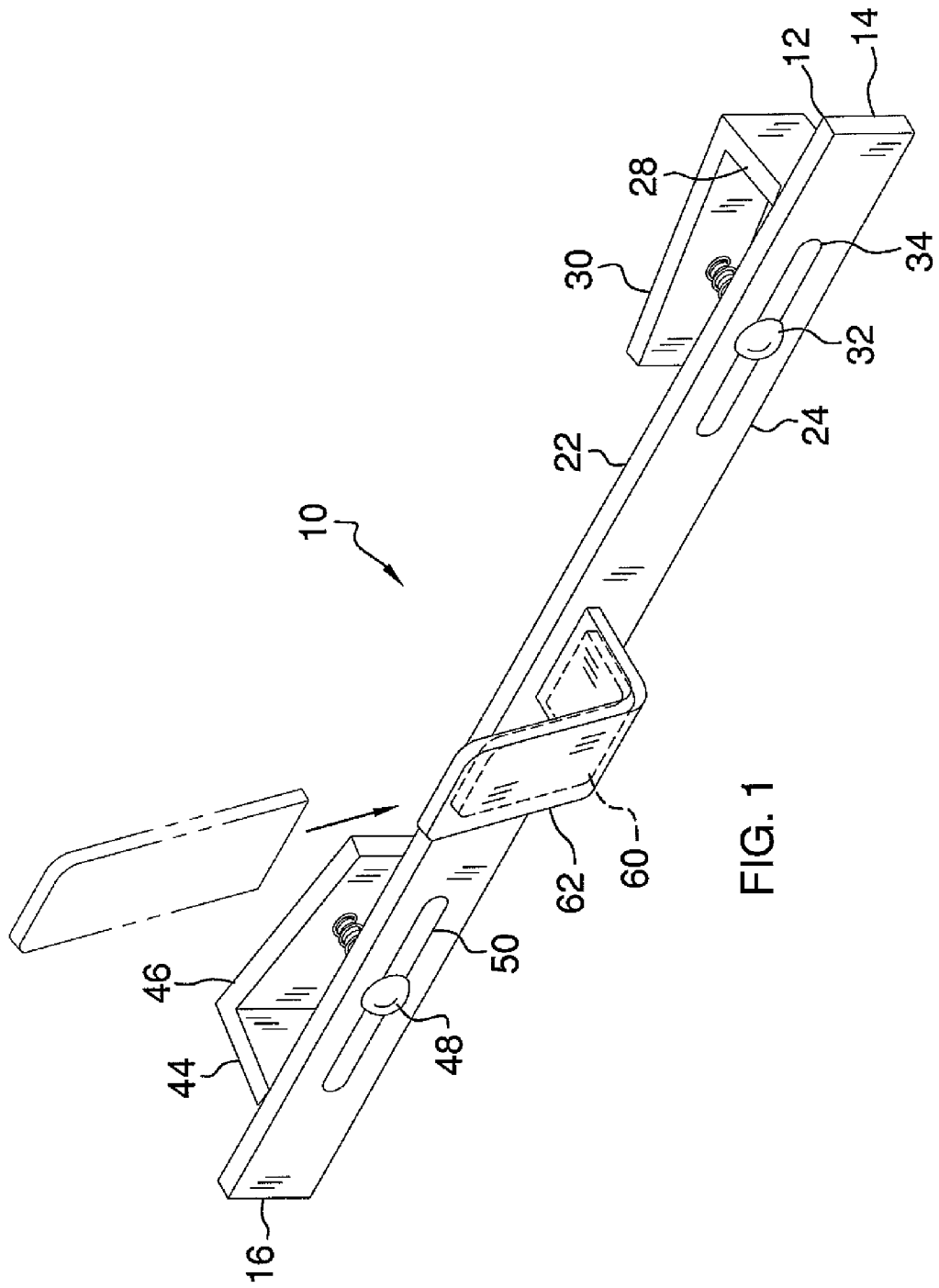
FIG. 1 is a top perspective view of a bracket assembly according to an embodiment of the disclosure.
Figure 2:
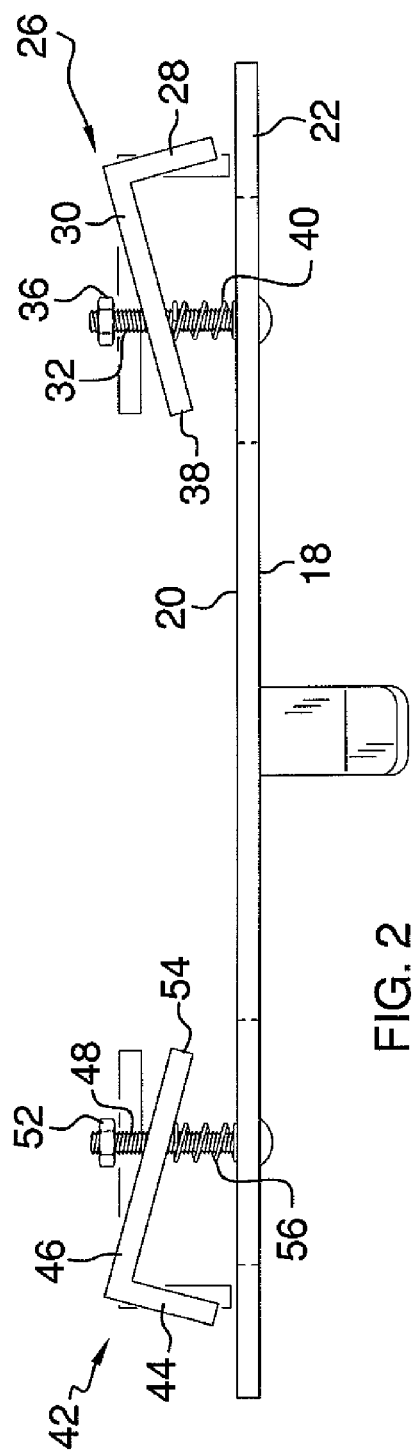
FIG. 2 is a top view of an embodiment of the disclosure.
Figure 3:
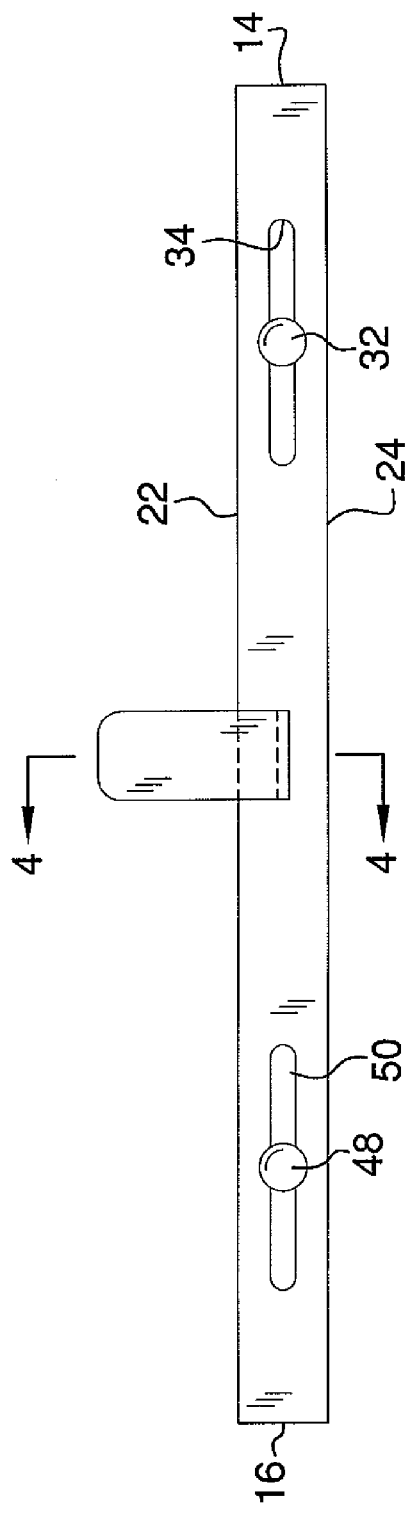
FIG. 3 is front view of an embodiment of the disclosure.

With reference now to the drawings, and in particular to FIGS. 1 through 8 thereof, a new bracket device embodying the principles and concepts of an embodiment of the disclosure and generally designated by the reference numeral 10 will be described.

As best illustrated in FIGS. 1 through 8, the bracket assembly 10 generally comprises an elongated plate 12 that has a first end 14, a second end 16, a front side 18, a back side 20, an upper edge 22 and a lower edge 24. The plate 12 is comprised of a rigid metal or plastic material and has a length from the first end 14 to the second end 16 between 12 inches and 24 inches.

A first coupler 26 is attached to and extends away from the back side 20. The first coupler 26 is positioned adjacent to the first end 16, The first coupler 26 includes a first portion 28 and a second portion 30 attached to each other. The first 28 and second 30 portions are orientated approximately perpendicular to each other. The first portion 28 extends away from the back side 20 and the second portion 30 extends generally toward the second end 16. Though the first coupler 26 may be fixedly coupled to the plate 12, the first coupler 26 may be attached to the plate 12 by a post 32 that extends through a slot 34 extending through the plate 12. The post 32 extends through the second portion 30. The slot 34 is elongated along a line extending through the first 14 and second 16 ends to allow the post 32 to be slidably movable toward or away from the first end 14. A nut 36 is threadably coupled to the post 32. The second portion 30 is between the nut 36 and the plate 12 and the nut 36 is tightened to urge the an end 38 of the second portion 30 toward the back side 20 of the plate 12. A biasing member 40 is positioned on the post 32 and extends between the plate 12 and the second portion 30. The biasing member 40 inhibits movement of the post 32 along the slot 34.

Figure 7:
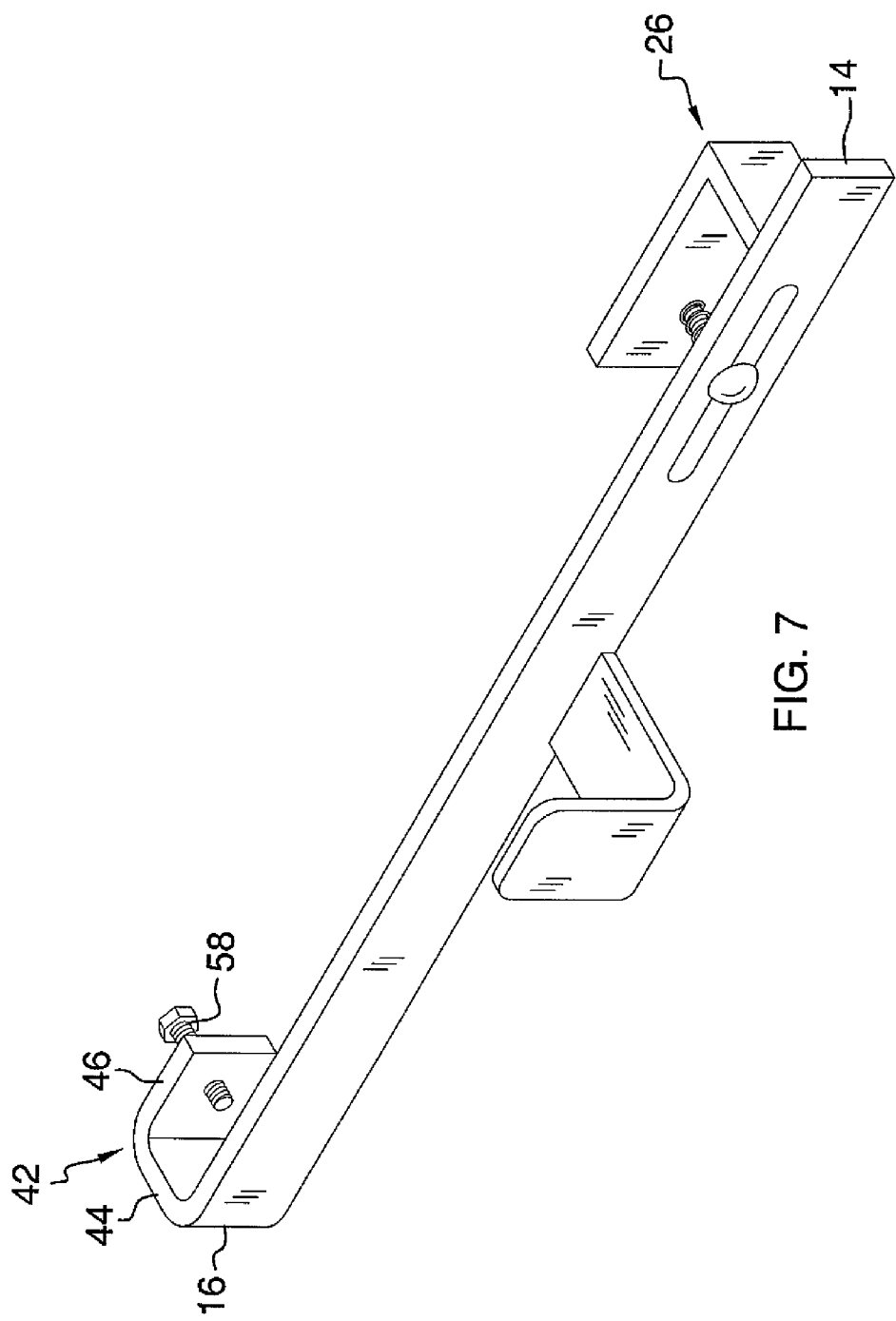
FIG. 7 is a front perspective view of an embodiment of the disclosure.

A second coupler 42 is attached to and extends away from the back side 20. The second coupler 42 is positioned adjacent to the second end 16. The second coupler 42 comprises a first section 44 and a second section 46 attached to each other and which are orientated perpendicular to each other. The first section 44 extends away from the back side 20 and the second section 46 extends generally toward the first end 14. The second coupler 42 may be fixedly coupled to the plate 12 as shown by the embodiment in FIG. 7. Alternatively, a rod 48 may be extended through an opening 50 extending through the plate 12. The rod 48 extends through the second section 46 and the opening 50 is elongated along a line extending through the first 14 and second 16 ends to allow the rod 48 to be slidably movable toward or away from the second end 16. A nut 52 is threadably coupled to the rod 48 and the second section 46 is between the nut 52 and the plate 12. The nut 52 is tightened to urge the an end 54 of the second section 46 toward the back side 20 of the plate 12. A biasing member 56 is positioned on the rod 48 and extends between the plate 12 and the second section 46. The biasing member 56 inhibits movement of the rod 48 along the opening 50. If the second coupler 52 is fixed, as shown in FIG. 7, a bolt 58 may be threadably coupled to the second section 46 and rotated to engage an object to which the second coupler 42 is to be attached.

As shown in FIG. 1, a catch 60 is attached to and extends away from the front side 18 of the plate 12. The catch 60 is positioned between the first 14 and second 16 ends, and approximately equally spaced from the first 14 and second 16 ends. A resiliently compressible cover 62 is removably positioned on the catch 60 to protect objects placed on the catch.

Figure 6:
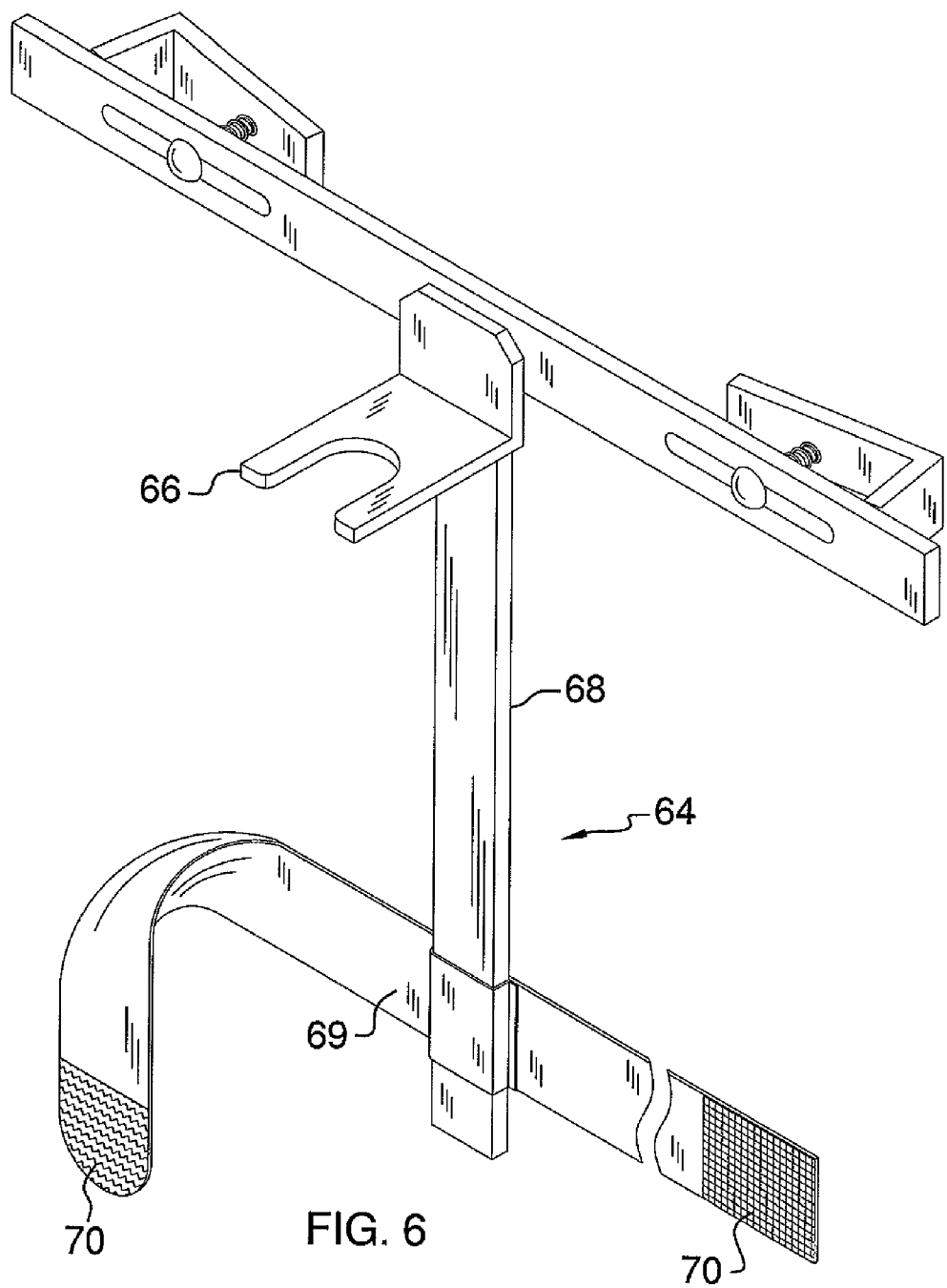
FIG. 6 is a front perspective view of an embodiment of the disclosure.

FIG. 6 depicts a catch 64 that includes a notched, outwardly extended panel 66 to receive the head of a fire extinguisher and a post 68 being attached to and extending downwardly from the plate 12 and the panel 66. A strap 69 is attached to the post 68 and is securable in a closed loop with a hook and loop closure 70 to hold the fire extinguisher against the post 68.

Figure 8:
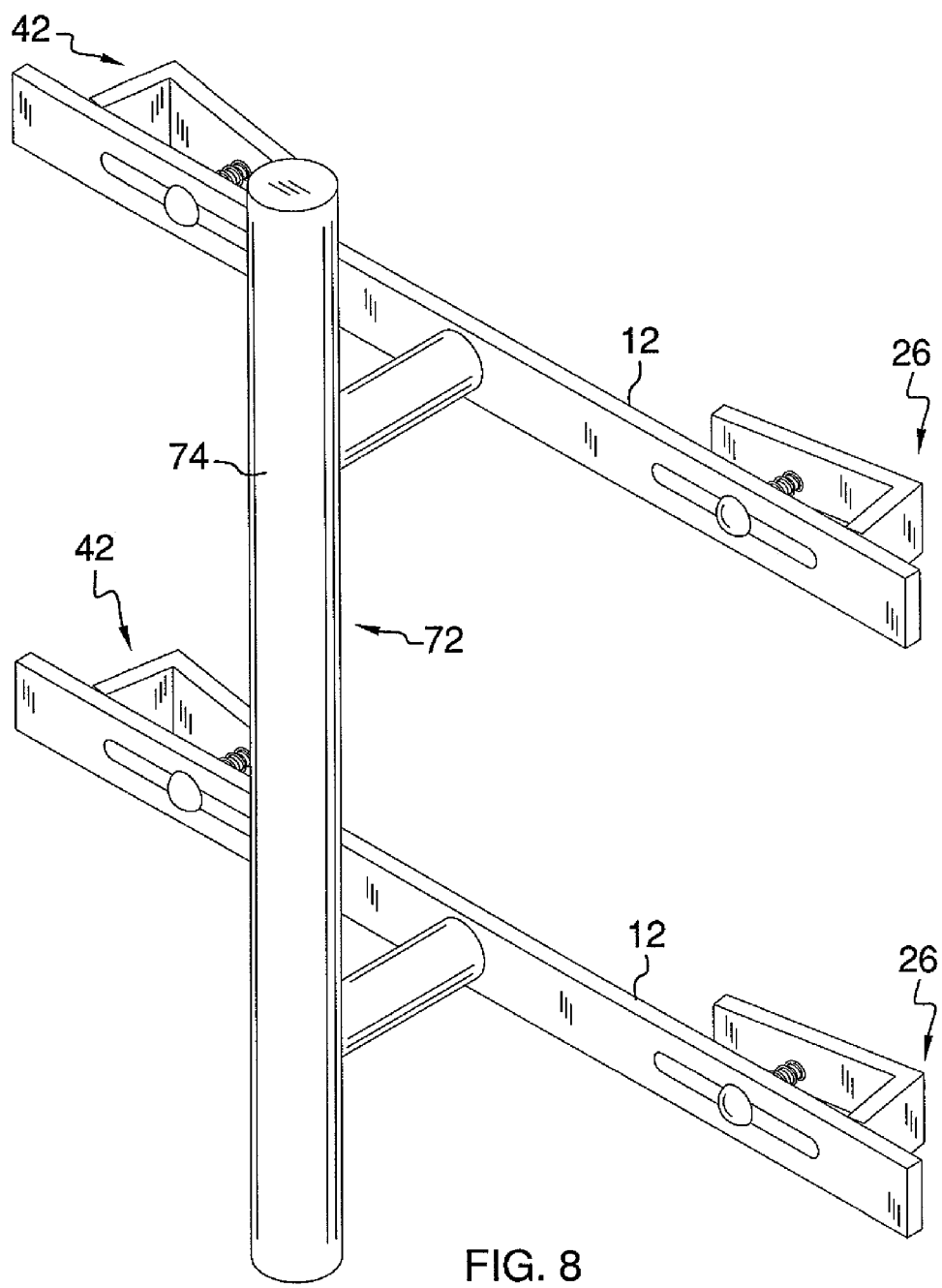
FIG. 8 is a front perspective view of an embodiment of the disclosure.

FIG. 8 depicts yet another catch 72 including a bar 74 extending between a pair of plates 12, each having first 26 and second 42 couplers. The bar 74 can be used for multiple uses either as an attachment point for other articles, such as lights, or as a handgrip.

In use, the first 26 and second 42 couplers are engageable with opposite sides 7 of a support member 6 to allow an article to be positioned on the catch 60. The support member 6 can be either horizontally or vertically orientated, depending on the particular usage of the assembly 10. The assembly 10 is particularly well suited for attachment to I-beams which otherwise are difficult to attach articles to.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A bracket assembly being attachable to a support member to mount an article on the support member, said assembly comprising:
   an elongated plate having a first end, a second end, a front side, a back side, an upper edge and a lower edge;
   a first coupler being mounted to said back side, said first coupler being positioned adjacent to said first end, said first coupler being movable toward or away from each of said back side and said first end of said plate, said first coupler being pivotable with respect to said plate, said first coupler including;
     a first portion and a second portion attached to each other and being orientated perpendicular to each other, said first portion extending away from said back side, said second portion extending generally toward said second end, said second portion having a distal end and a proximal end with respect to said first portion;
     a post extending through a slot extending through said plate, said post extending through said second portion, said first and second portions being free with respect to said plate such that said first and second portions may pivot on said post, said post being positioned nearer to said distal end than said to first portion;
     a nut being threadably coupled to said post, said second portion being between said nut and said plate, said nut being tightened to urge said an end of said second portion toward said back side of said plate;
   a second coupler being attached to and extending away from said back side, said second coupler being positioned adjacent to said second end;
   a catch being attached to and extending away from said front side of said plate, said catch being positioned between said first and second ends; and
   wherein said first and second couplers are engageable with opposite sides of the support member to allow an article to be positioned on said catch.

2. The assembly according to claim 1, wherein said first coupler further includes:
   said slot being elongated along a line extending through said first and second ends to allow said post to be slidably movable toward or away from said first end; and
   a biasing member being positioned on said post and extending between said plate and said second portion, said biasing member inhibiting movement of said post along said slot.

3. The assembly according to claim 2, wherein said second coupler comprises:
   a first section and a second section attached to each other and being orientated perpendicular to each other, said first section extending away from said back side, said second section extending generally toward said first end;
   a rod extending through an opening extending through said plate, said rod extending through said second section, said first and second sections being free with respect to said plate such that said first and second sections may pivot on said rod; and
   a nut being threadably coupled to said rod, said second section being between said nut and said plate, said nut being tightened to urge said an end of said second section toward said back side of said plate.

4. The assembly according to claim 3, wherein said second coupler further comprises:
   said opening being elongated along a line extending through said first and second ends to allow said rod to be slidably movable toward or away from said second end; and
   a biasing member being positioned on said rod and extending between said plate and said second section, said biasing member inhibiting movement of said rod along said opening.

5. The assembly according to claim 1, further including a resiliently compressible cover being positioned on said catch.

6. A bracket assembly being attachable to a support member to mount an article on the support member, said assembly comprising:
   an elongated plate having a first end, a second end, a front side, a back side, an upper edge and a lower edge;
   a first coupler being attached to and extending away from said back side, said first coupler being positioned adjacent to said first end, said first coupler including;
     a first portion and a second portion attached to each other and being orientated perpendicular to each other, said first portion extending away from said back side, said second portion extending generally toward said second end, said second portion having a distal end and a proximal end with respect to said first portion;
     a post extending through a slot extending through said plate, said post extending through said second portion, said slot being elongated along a line extending through said first and second ends to allow said post to be slidably movable toward or away from said first end, said first and second portions being free with respect to said plate such that said first and second portions may pivot on said post, said post being positioned nearer to said distal end than said to first portion;
     a nut being threadably coupled to said post, said second portion being between said nut and said plate, said nut being tightened to urge said an end of said second portion toward said back side of said plate;
     a biasing member being positioned on said post and extending between said plate and said second portion, said biasing member inhibiting movement of said post along said slot;

a second coupler being attached to and extending away from said back side, said second coupler being positioned adjacent to said second end, said second coupler comprising;
- a first section and a second section attached to each other and being orientated perpendicular to each other, said first section extending away from said back side, said second section extending generally toward said first end;
- a rod extending through an opening extending through said plate, said rod extending through said second section, said opening being elongated along a line extending through said first and second ends to allow said rod to be slidably movable toward or away from said second end, said first and second sections being free with respect to said plate such that said first and second sections may pivot on said rod;
- a nut being threadably coupled to said rod, said second section being between said nut and said plate, said nut being tightened to urge said an end of said second section toward said back side of said plate;
- a biasing member being positioned on said rod and extending between said plate and said second section, said biasing member inhibiting movement of said rod along said opening;

a catch being attached to and extending away from said front side of said plate, said catch being positioned between said first and second ends;

a resiliently compressible cover being positioned on said catch; and wherein said first and second couplers are engageable with opposite sides of the support member to allow an article to be positioned on said catch.

* * * * *